Nov. 15, 1938.   A. DUBONNET   2,136,586
WHEEL MOUNTING
Filed Jan. 5, 1933   2 Sheets-Sheet 2

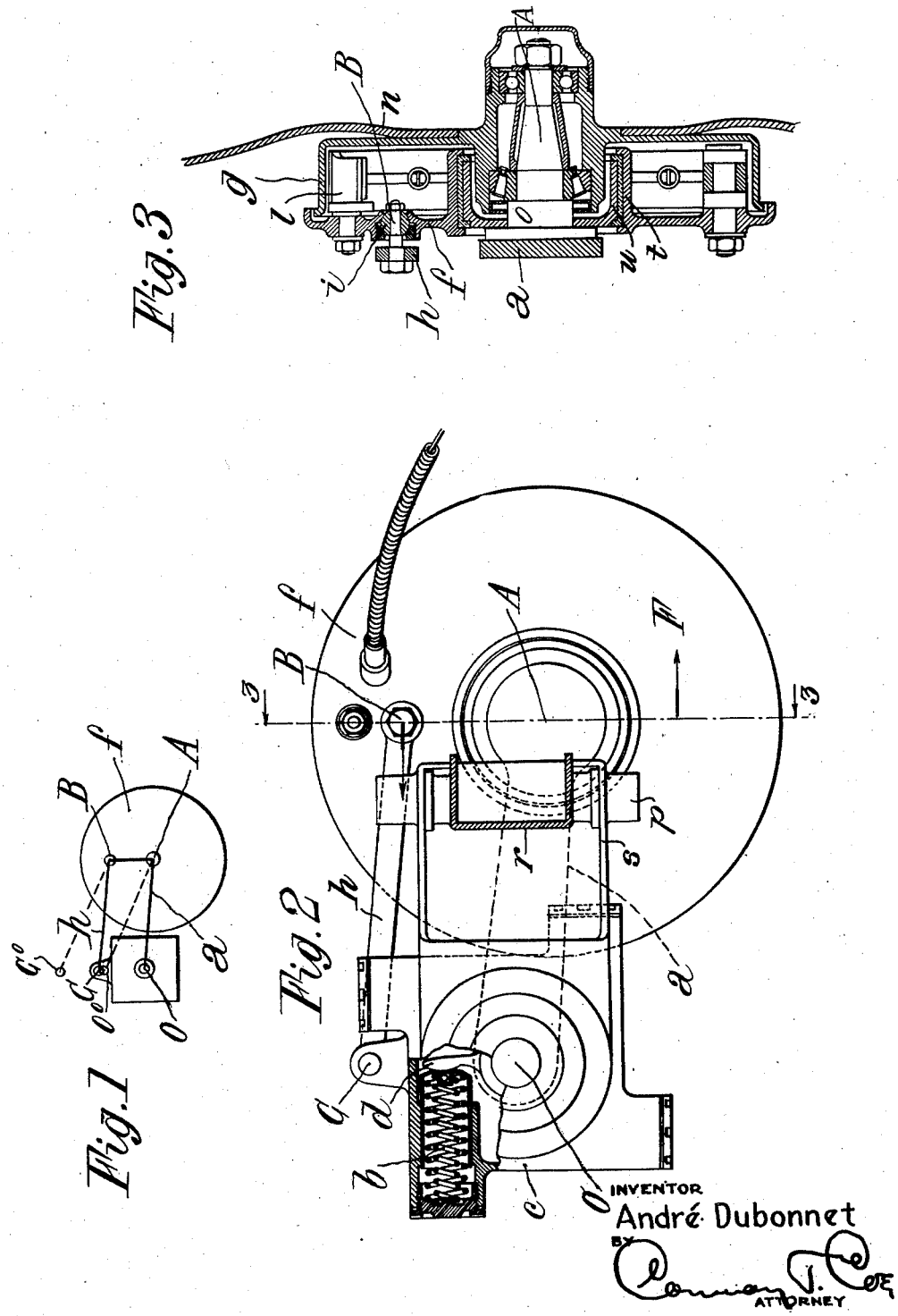

INVENTOR
André Dubonnet

Patented Nov. 15, 1938

2,136,586

UNITED STATES PATENT OFFICE 2,136,586

WHEEL MOUNTING

André Dubonnet, Neuilly-sur-Seine, France

Application January 5, 1933, Serial No. 650,355
In Belgium November 14, 1932

27 Claims. (Cl. 267—20)

The present invention relates to wheel mountings, especially to an arrangement for correcting certain undesirable movements of a vehicle chassis during acceleration and, more particularly, during negative acceleration.

In vehicles equipped with independent wheels of the type described in the inventor's co-pending application Serial Number 415,510 filed Dec. 20, 1929, and even in vehicles equipped with axles of the usual type it is found that, during negative acceleration (slowing down) from high or even moderate speeds, the turning couple produced by the action of the brakes on the wheels causes the forward part of the chassis to dip downward. In other words, the forward momentum of the car acting at its center of gravity with the resistance caused by braking at the point of contact between the wheel and the rod combine to produce a couple of such a nature as to tend to raise the rear end of the vehicle and depress the front end thereof.

One of the objects of the present invention is to correct this dipping effect.

Other objects will appear in the course of the detailed description now to be given with reference to the accompanying drawings, in which:

Figure 1 represents, diagrammatically, one illustrated embodiment of the invention;

Figure 2 is a section through a chassis and suspension of the type described in the co-pending application above referred to and showing the details of construction of the assembly illustrated in Figure 1;

Figure 3 is a vertical section on the line 3—3 of Figure 2;

Figure 4:
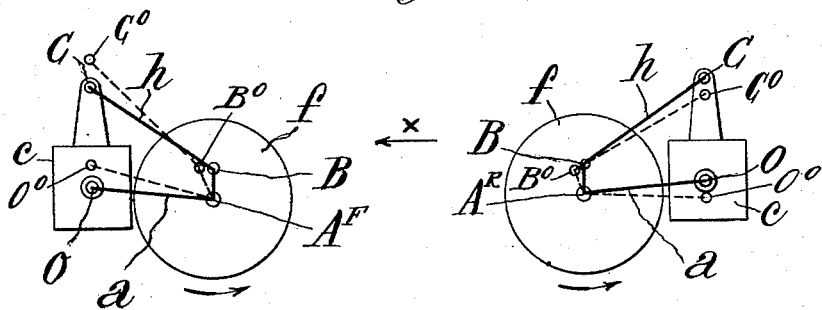
Figure 5:
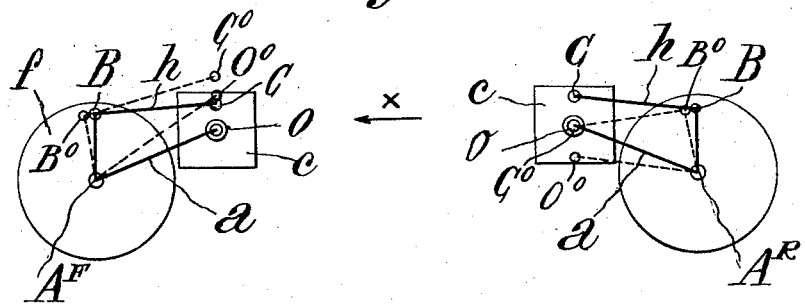
Figure 6:
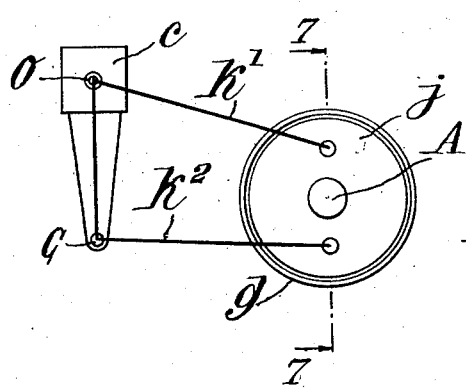
Figure 7:
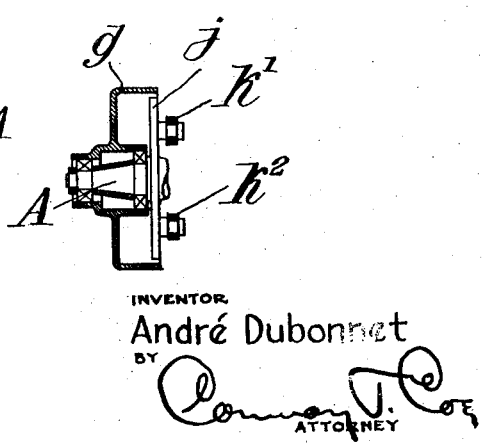

Figure 4 includes two diagrams showing a second form of correcting device for two wheels of a vehicle wherein the rear wheel is mounted in front of and the front wheel behind a pivotal support;

Figure 5 is a similar pair of diagrams representing a different form of correcting device for wheels in which the rear wheel is mounted behind and the front wheel in front of the support;

Figure 6 represents, diagrammatically, a correcting device adapted to be used on vehicle wheels suspended from an axle in the usual way;

Figure 7 is a section taken on line 7—7 of Figure 6.

Referring to Figures 1 to 3 of the drawings, there is shown an independent wheel suspension of the type described in the inventor's co-pending application and comprising a lever $a$ provided, at one extremity, with a wheel supporting spindle A and, at the other extremity, with a shaft O parallel to spindle A, shaft O being fitted with a plurality of arms $d$ reacting on a combination of suspension and shock-absorbing springs $b$ contained in a closed casing $c$. Casing $c$, in the case of rear wheels, is directly supported on the chassis and in the case of front wheels, as shown in Figure 2, is supported by arms $s$ on a pivot $p$ mounted on the front portion $r$ of the chassis. In order to correct dipping of the chassis when the brakes are applied, supporting plate $f$ for the brake jaws $l$, which is fixed with respect to A in the conventional prior art, is mounted to pivot around the corresponding wheel spindle as an axis, this being effected through the intermediary of a cylindrical sleeve $t$ firmly connected to element $f$ and co-acting with a corresponding supporting surface $u$ mounted on the wheel spindle. Means are provided for preventing rotation of element $f$ with the wheel comprising a link $h$ pivotally connected at one extremity B to element $f$ and engaging pivotally at the other extremity C with some element fixed with respect to the chassis such as casing $c$. If desired, the connection between link $h$ and element $f$ may take the form of a universal or ball-and-socket joint $i$.

From the foregoing, it will be readily seen that link $h$ will prevent rotation of element $f$ with the wheel and that the lines joining points A B C and O constitute a quadrilateral. If the lengths of elements $a$ and $h$ be made equal as well as distances A B and C O, the quadrilateral becomes a parallelogram and side A B will always move through parallel positions irrespective of angular displacements of elements $a$ and $h$ (see Figure 1). Preferably, the parallelogram should be designed to become rectangular when the vehicle is at rest.

When the brake jaws $l$ supported by element $f$ are applied to brake drum $g$, the couple F exerted on element $f$ is incapable of deforming the parallelogram above referred to since it would be necessary that the couple in question do work during such a deformation. In order that work be done, it would be necessary for element $f$ to rotate angularly. But this is impossible because of the fact that the line joining A and B always moves through parallel positions.

In the form of assembly represented in Figure 4, element $f$ is mounted to be capable of oscillating relatively to lever $a$ and the couple developed during application of the brakes is transmitted to the latter in the form of a couple which is different from the braking couple, and preferably opposed to the latter. In this figure $A^F$ designates the front axle and $A^R$ the rear axle, the vehicle moving in the direction of the arrow $x$.

The general assembly is substantially the same as in Figures 1 to 3 except that the parallelogram is transformed into a trapezoid designed so that a dipping or rising action of the chassis relatively to the wheel axle or spindle is caused by an angular displacement of element $f$ in the direction toward which it tends to move when the brakes are applied. As illustrative of one possible form of assembly, sides A B and O C of the trapezoid may be chosen to lie parallel when the vehicle is at rest and link $h$ is given sufficient length to lie obliquely with relation to wheel supporting arm $a$. If the wheel is mounted on the front of the chassis posteriorly to point O or on the rear of the chassis in front of point O, it is found in practice that side O C must be longer than side A B if it be desired to obtain a lifting effect on the chassis when the brakes are applied. Contrariwise, if the front axle $A^F$ is positioned in front of point O or the rear axle $A^R$ behind this latter point, as shown in Figure 5, side A B must be made longer than O C to obtain the same effect.

In the assemblies so far described, the wheels have been assumed to be supported on lever $a$. However, it is possible to obtain a correcting effect even when the wheel spindle is firmly attached to a plate $f$ equivalent to element $f$ (see Figures 6 and 7), said plate being supported from the chassis by a pair of arms $k^1$ $k^2$ pivoted at fixed points O and C respectively and provided with elastic means (not shown) reacting on at least one arm. Inspection of Figures 6 and 7 will show that these two arms constitute two sides of a quadrilateral of the type already referred to and that, by properly chosing the length thereof, dipping movements of the chassis may be corrected in a manner which will be obvious to those skilled in the art.

These arrangements will prevent the dip caused by the usual brake systems for the reasons explained hereinafter. Considering Figures 1 and 2, if the vehicle is moving towards the left in these figures the wheel will be turning in a counterclockwise direction. When the brake is applied, the couple F is exerted on the brake plate $f$ and tends to turn the line A B counterclockwise around the point A. This is impossible because the system A B C O is a parallelogram and cannot be distorted in this direction. However, this torque will tend to drive the point B downward which will result in raising the points C and O to the points C° and O° respectively. Since the points C and O are fixed with respect to the chassis the front end of the chassis will be raised against the dipping action and the chassis will thus remain level.

Considering Figure 4, the counterclockwise torque exerted against B will turn this point to B° and will force the point C up to C°, thereby raising O to O°. In the case of the rear wheel, on the other hand, the movement of B to B° will depress the points C and O to C° and O° respectively. In the same way in Figure 5 the torques moving the points B to B° will raise and depress the points C and O to C° and O° on the front and rear wheels respectively. The same action will obviously take place in the construction shown in Figures 6 and 7.

What I claim is:—

1. A wheel mounting for a vehicle having a chassis, comprising a wheel spindle, a member around said spindle capable of angular turning movement with respect thereto, an arm pivoted on said chassis to turn about a substantially horizontal axis, spring means resisting turning of said arm in at least one direction, and means including said arm to support said wheel spindle rigidly perpendicular to said arm and to limit turning movement of said member, said last means further including a rigid element pivoted to said chassis and member.

2. A steering wheel mounting for a vehicle having a chassis, comprising a member mounted on said chassis to turn about a substantially vertical axis, an arm mounted in said member to turn about a substantially horizontal axis, spring means in said member resisting turning of said arm in one direction, a wheel spindle, an element mounted around said wheel spindle and capable of angular movement with respect thereto, and means including said arm to support said wheel spindle and to limit turning movement of said arm.

3. In a device as claimed in claim 2, said spindle being substantially perpendicular to the longitudinal axis of said arm and being rigidly mounted with respect to said arm.

4. A wheel mounting for a vehicle having a chassis, comprising an arm mounted on said chassis to turn about a substantially horizontal axis, a wheel spindle mounted on the free end of said arm, spring means on said chassis resisting turning of said arm in at least one direction, a brake supporting plate mounted on said spindle and capable of angular turning movement with respect thereto, and means connected to said chassis and plate to limit such turning movement.

5. A wheel mounting for a vehicle having a chassis, comprising an arm mounted in said chassis to turn about a substantially horizontal axis, a wheel spindle at the free end of said arm substantially perpendicular thereto, spring means on said chassis resisting movement of said arm in at least one direction, a brake supporting plate mounted around said spindle and capable of angular movement with respect thereto, and a rigid link pivoted to said plate and chassis for limiting turning movement of said plate.

6. A steering wheel mounting for a vehicle having a chassis, comprising an element mounted on said chassis to turn about a substantially vertical axis, a pair of members pivoted in said element about substantially parallel horizontal axes and extending substantially perpendicularly to said axes, means yieldingly resisting movement of at least one of the members with respect to said element, and a wheel spindle rigidly supported by said members substantially perpendicularly thereto.

7. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle, an element mounted around said wheel spindle and capable of angular movement with respect thereto, and means including said arm to support said wheel spindle and to limit turning movement of said element.

8. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle, an element mounted around said wheel spindle and capable of angular movement with respect thereto, and means including said arm to support said wheel spindle and to limit turning movement of said element, said spindle being held in a fixed line with respect to said arm for all wheel positions.

9. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle, an element mounted around said wheel spindle and capable of angular movement with respect thereto, and means including said arm to support said wheel spindle and to limit turning movement of said element, said spindle being held in a fixed line with respect to said arm and perpendicular thereto for all wheel positions.

10. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle, a brake supporting plate mounted around said spindle and capable of angular movement with respect thereto and means including said arm to support said wheel spindle and to limit turning movement of said plate.

11. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle, a brake supporting plate mounted around said spindle and capable of angular movement with respect thereto and means including said arm to support said wheel spindle and to limit turning movement of said plate, said spindle being held in a fixed line with respect to said arm for all wheel positions.

12. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle, a brake supporting plate mounted around said spindle and capable of angular movement with respect thereto and means including said arm to support said wheel spindle and to limit turning movement of said plate, said spindle being held in a fixed line with respect to said arm and perpendicular thereto for all wheel positions.

13. A steering wheel mounting for a vehicle having a chassis, comprising an element mounted on said chassis to turn about a substantially vertical axis, a pair of members pivoted in said element about substantially parallel horizontal axes and extending substantially perpendicularly to said axes, means yieldingly resisting movement of at least one of said members with respect to said element, a wheel spindle supported by said members and held substantially perpendicularly thereto for all wheel positions, a brake supporting plate mounted around said spindle and capable of angular turning movement with respect thereto, at least one of said members being connected to said plate to limit the turning movement thereof.

14. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle mounted at the free end of said arm, a brake supporting plate mounted around said spindle and capable of angular movement with respect thereto, and a link pivoted to said plate and chassis for limiting turning movement of said plate.

15. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle mounted at the free end of said arm, a brake supporting plate mounted around said spindle and capable of angular movement with respect thereto, and a link pivoted to said plate and chassis for limiting turning movement of said plate, the length of said link being different from that of said arm.

16. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle mounted at the free end of said arm, a brake supporting plate mounted around said spindle and capable of angular movement with respect thereto, and a link pivoted to said plate and chassis for limiting turning movement of said plate, the distance between the free end of the arm and the point where said link is pivoted on said plate being different from the distance between the other ends of said arm and link.

17. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle mounted at the free end of said arm, a brake supporting plate mounted around said spindle and capable of angular movement with respect thereto, and a link pivoted to said plate and chassis for limiting turning movement of said plate, the axle around which said arm is pivoted in said member being in front of said spindle and the length of said link being greater than that of said arm.

18. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle mounted at the free end of said arm, a brake supporting plate mounted around said spindle and capable of angular movement with respect thereto, and a link pivoted to said plate and chassis for limiting turning movement of said plate, the axle around which said arm is pivoted in said member being behind said spindle and the length of said link being less than that of said arm.

19. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle mounted at the free end of said arm, a brake supporting plate mounted around said spindle and capable of angular movement with respect thereto, and a link pivoted to said plate and chassis for limiting turning movement of said plate, the length of said link being different from that of said arm, the distance between the free end of said arm and the point where said link is pivoted on said plate being less than the distance between the other ends of said arm and link.

20. A steering wheel mounting for a vehicle having a chassis, comprising a member mounted on said chassis to turn about a substantially vertical axis, an arm mounted in said member to turn about a substantially horizontal axis, means yieldingly resisting movement of said arm with respect to said member, a wheel spindle mounted at the free end of said arm, a brake supporting plate mounted around said spindle and capable of angular movement with respect thereto, and a link pivoted to said plate and chassis for limiting turning movement of said plate, the length of said link being different from that of said arm, the distance between the free end of said arm and the point where said link is pivoted on said plate being greater than the distance between the other ends of said arm and link.

21. A steering wheel mounting for a vehicle having a chassis, comprising an element mounted on said chassis to turn about a substantially vertical axis, a pair of members pivoted in said element about substantially parallel horizontal axes and extending substantially perpendicularly to said axes, means yieldingly resisting movement of at least one of the members with respect to said element, and a wheel spindle supported by said members and held substantially parallel to the pivots of said members for all wheel positions.

22. In a vehicle suspension system in combination, a vehicle frame, a road wheel, brake shoes for the road wheel, a supporting pivotal linkage system for the road wheel, including a pair of spaced link members pivoted for swinging movement about a pair of parallel axes in different substantially horizontal planes in fixed relation to the frame, a brake shoe supporting member pivotally connected at spaced points thereof to the spaced link members, its pivot axes thereon being parallel to the aforesaid axes and together with the two link members and the frame constituting a quadrilateral deformable in a substantially vertical plane, a spindle for the road wheel substantially parallel to the aforesaid axes having its axis fixed reatively to the brake shoe supporting member, and means resiliently restraining pivotal movement of the link members relatively to the frame.

23. In a vehicle suspension system in combination, a vehicle frame, a road wheel, brake shoes for the road wheel, a supporting pivotal linkage system for the road wheel, including a pair of spaced link members pivoted for swinging movement about a pair of parallel axes in different substantially horizontal planes in fixed relation to the frame, a brake shoe supporting member pivotally connected at spaced points thereof to the spaced link members, its pivot axes thereon being parallel to the aforesaid axes and together with the two link members and the frame constituting a quadrilateral deformable in a substantially vertical plane, a spindle for the road wheel substantially parallel to the aforesaid axes having its axis fixed relatively to the brake shoe supporting member, and means resiliently restraining pivotal movement of the link members relatively to the frame, said link members being of different lengths.

24. In a vehicle suspension system in combination, a vehicle frame, an element mounted on said frame to turn about a substantially vertical axis, a road wheel, brake shoes for the road wheel, a supporting pivotal linkage system for the road wheel, including a pair of spaced link members pivoted to said element for swinging movement about a pair of parallel axes in different substantially horizontal planes in fixed relation to the frame, a brake shoe supporting member pivotally connected at spaced points thereof to the spaced link members, its pivot axes thereon being parallel to the aforesaid axes and together with the two link members and the element constituting a quadrilateral deformable in a substantially vertical plane, a spindle for the road wheel substantially parallel to the aforesaid axes having its axis fixed reltively to the brake shoe supporting member, and means resiliently restraining pivotal movement of the link members relatively to the element.

25. A wheel mounting for a vehicle having a chassis, comprising a wheel spindle, a member around said spindle capable of angular turning movement with respect thereto, an arm pivoted on said chassis to turn about a substantially horizontal axis, spring means resisting turning of said arm in at least one direction, and means including said arm to support said wheel spindle rigidly perpendicular to said arm and to limit turning movement of said member, said last means further including an element pivoted to said chassis and member, said element being angularly arranged with respect to said arm.

26. A wheel mounting for a vehicle having a chassis, comprising an arm pivoted on said chassis to turn about a substantially horizontal axis, a wheel spindle directly carried by said arm, a member around said spindle capable of angular turning movement with respect thereto, spring means resisting turning of said arm in at least one direction, and means including said arm to support said wheel spindle rigidly perpendicular to said arm and to limit turning movement of said member, said last means further including an element pivotally connected to said chassis and member.

27. A wheel mounting for a vehicle having a chassis, comprising an arm pivoted on said chassis to turn about a substantially horizontal axis, a wheel spindle directly carried by said arm, a member around said spindle capable of angular turning movement with respect thereto, spring means resisting turning of said arm in at least one direction, and means including said arm to support said wheel spindle rigidly perpendicular to said arm and to limit turning movement of said member, said last means further including an element pivotally connected to said chassis and member, said element being angularly arranged with respect to said arm.

ANDRÉ DUBONNET.